Oct. 19, 1954  S. SIEGEL  2,691,816
MANUFACTURE OF COMPOSITE MULTILAYER SHEET METAL MATERIAL
Filed Jan. 4, 1951

Sidney Siegel,
Inventor.
Koenig and Pope,
Attorneys.

Patented Oct. 19, 1954

2,691,816

UNITED STATES PATENT OFFICE 2,691,816

MANUFACTURE OF COMPOSITE MULTI-LAYER SHEET METAL MATERIAL

Sidney Siegel, Attleboro, Mass., assignor to Metals & Controls Corporation, Attleboro, Mass., a corporation of Massachusetts Application January 4, 1951, Serial No. 204,388

2 Claims. (Cl. 29—189)

This invention relates to the manufacture of composite multi-layer material, and more particularly to the manufacture of so-called "low quality" precious or rare metal composite sheet and strip, such as gold alloy on base metal. By "low quality" composite sheet and strip, I mean material consisting of a very thin layer of a precious or rare metal, such as gold, for example, on a much thicker base of a base metal, such as nickel, for example, the assay or proportion by weight of the precious or rare metal to the total weight of the material being relatively low, for example of the order of one to twenty.

For the purpose of describing my invention, I will discuss in detail its application to the manufacture of sheet and strip.

In the manufacture of low quality precious or rare metal "plate" (composite precious metal and base metal) such as gold plate, for example, it is of importance to be able economically to control the quality or assay of the plate within a narrow tolerance, preferably better than ±3%, to insure that the purchaser of the plate obtains the quality or assay bargained for, and also to insure that the manufacturer does not put more than is required of the precious or rare metal into the plate. By the "quality" of the plate I mean the assay value of the plate, i. e., the proportion by weight of the precious or rare metal to the total weight. In addition, it is important in the manufacture of precious or rare metal plate, to be able to manufacture the material in long strips since such manufacture is more economical than making up the material in short strips. Preferably, it is desired to manufacture plate by a continuous solid-phase bonding procedure, for maximum economy. In such a process, the control of quality or assay is a problem particularly in the manufacture of low quality plate by rolling mills available on the market, for example, plate having a quality or assay of the order of 1 to 20, due to the thinness of the precious or rare metal required in the final product and the difficulty of accurately rolling out the precious or rare metal to the required thinness for continuous solid phase bonding in a conventional rolling mill. This invention solves the problem of maintaining close control of the quality or assay of the plate and enables the economical production of low quality plates with a control on quality or assay better than ±3%. For example, where it is desired to produce plate of 1 to 20 quality or assay, by a continuous solid-phase bonding process, by following this invention there is no difficulty in economically producing plate which will assay no more than ±3% from the desired quality, which is very close control as regards such low quality plate.

The necessity for the invention in part arises from the fact that even the best rolling mills of type and size which are economically available to the manufacturer of plate inherently cannot roll material with absolute precision, and the rolling error is ultimately reflected in the quality or assay of the plate; and also in part from the fact that there is a limit on the thickness of material that can be conveniently handled and rolled in a continuous solid phase bonding process, such as described in two co-assigned copending applications of Helmich W. Boessenkool and George Durst, the first entitled Bonded Metals and Their Manufacture, Serial No. 86,857, filed April 11, 1949, now abandoned; the second entitled Solid Phase Bonding of Metals, Serial No. 204,346, filed January 4, 1951, or in the co-assigned copending application of Helmich W. Boessenkool, George Durst and myself, entitled Solid Phase Bonding of Metals, Serial No. 204,646, filed January 5, 1951. Also, the characteristics of the rolling equipment and convenience in handling impose a limitation on the total thickness of material that can be handled in such a continuous solid-phase bonding process. For example, it is desirable to use material thin enough to be coiled without resorting to very expensive coiling and handling equipment. This invention makes possible the economical production of low quality plate with close control on its assay with a small, relatively low-cost mill used for the solid-phase bonding, and eliminates any necessity for use of a heavy, expensive mill and expensive handling equipment.

As to rolling error, it is important to understand that even the best economically available rolling mills are not absolutely precise, particularly so in rolling very thin material. For example, in the case of a Sendzimir mill which I have used, there is a rolling error which in terms of percent of variation is a minimum and of the order of ±1% where the material being rolled is of any thickness down to about .025 inch, and which then increases as the gauge decreases in such manner that for gauges of .004 inch and less, the error is of the order of ±5%. I refer hereinafter to the gauge above which the percent rolling error is substantially constant and a minimum, and below which the percent rolling error increases as the gauge decreases, as the "critical gauge."

As an example of the effect of rolling error, assume that a twelve karat 1/20 quality gold on pure nickel plate is to be bonded by a continuous solid-phase bonding operation. In such on operation, the over-all thickness of material that can be conveniently and economically handled as continuous strip with commercially available equipment, will be for example approximately .120 inch. Under these circumstances, if the gold is bonded directly to the pure nickel base layer, the thickness of the gold will be approximately .0051 inch. From the remarks given above in connection with rolling error, it is apparent that the best tolerance that can be obtained on the gold itself would be approximately ±.0002 inch, which is ±4%. Without considering at all the variation in the nickel that is being used, the assay of the finally bonded material may be expected to vary at least ±4% as a function of the variation in the thickness of the original gold strip alone.

In order to overcome this inaccuracy, the plating can be done in two ways: In the first way, I can start with a nickel base strip which is .657 inch thick, and on this directly solid-phase bond the gold of requisite thickness, which would be .025 inch (note that the .025 inch is the minimum thickness at which I can get a ±1% rolling error in the gold); or, the present invention can be followed which separates the bonding operation into three steps, which three-step procedure is the gist of the present invention. In the first solution, the handling equipment necessary to directly and continuously solid-phase bond material having a thickness of .657 inch can be obtained, but the cost of such machinery is extremely high and may be completely out of the financial reach of the average manufacturing company interested in this invention. That is, it is uneconomical to obtain such large and complex machinery when the plating can be done more economically by this invention with smaller and simpler machinery.

In general, according to the invention, the manufacture of the plate has as its first step the making of an intermediate or "B" plate. This "B" plate may start with a layer of a precious or rare metal (gold, for example) which has previously been formed as by rolling, to have a thickness at least as great as the "critical gauge" of the rolling mill. This layer constitutes the whole of the precious or rare metal to go into the final plate. This layer of gold is bonded to a layer of a base metal (nickel, for example) which is also as great in thickness as at least the said critical gauge, but less than the amount of base metal that goes into the finished material, and the two layers are rolled together with such a reduction in thickness as to become solid-phase bonded. This composite plate is the intermediate plate above and hereinafter referred to as the "B" plate. By "solid-phase bonding," I mean bonding the layers together without the formation of any liquid phase material at the interface. In general, it may be said that the ductile metals may be solid-phase bonded by rolling at cold-working temperatures with a relatively high percentage of reduction, or at elevated temperature with an amount of reduction which is correlated with the temperature. For a more complete description of solid-phase bonding, reference may be had to the above specified copending applications. If the rolling operation effects only a "nucleal" or incipient bond, rather than a strong, permanent bond, the bond may be improved and made strong and permanent by heating, as disclosed in said copending applications.

Or, for example, the "B" plate may be made by any of the standard procedures now utilized in the industry for the plating of rare or precious metals on base metals. In one of these, the surfaces of the precious metal and base metal that are to be joined together are first cleaned of any oxide or other gross contaminants, the layers are placed together in a protective wrapping, and then put in a heating furnace. In the furnace they are raised to a temperature of approximately 1500° F. and then removed from the furnace and placed under a hydraulic press where they are squeezed together to effect what amounts to a liquid phase bond. These conventional methods need not be further detailed here because they are well known in the art.

The second step of the invention lies in rolling the resultant two-layer "B" plate to precision gauge, that is, to some thickness at or above the said critical gauge.

The third step of the invention comprises bonding, by a continuous solid-phase bonding operation, this rolled "B" plate to a second layer of base metal of such thickness as to supply the additional quantity of base metal needed to provide the final quality or assay, in other words, to decrease in proper amount the proportion by weight of the precious or rare metal to the total weight of the final metal. This rolling operation is done in a continuous solid-phase bonding procedure at such temperature and with such a percentage of reduction as to bond the base metal layer of the "B" plate to the second base metal layer. Other features will be in part apparent and in part pointed out hereinafter.

While the above method is described with particular reference to solid-phase bonding, it is equally applicable to any continuous strip forming process where the use of relatively thin strips is desirable because of equipment considerations and where in addition high assay or inlay accuracy is necessary.

The invention accordingly comprises the steps and sequence of steps, and features of manipulation, which will be exemplified in the methods hereinafter described, and the scope of the application of which will be indicated in the following claims.

In the accompanying drawing, in which one of various possible embodiments of the invention is illustrated, Fig. 1 is a fragmentary section of a layer of a precious or rare metal and a layer of a base metal prior to the bonding thereof to form a two-layer intermediate or "B" plate;

Figure 1:
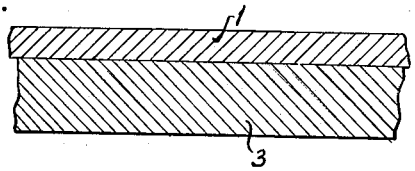

Thicknesses are exaggerated in all the figures, and are not necessarily in proportion.

Similar reference characters indicate corresponding parts throughout the several views of the drawings.

Figure 2:
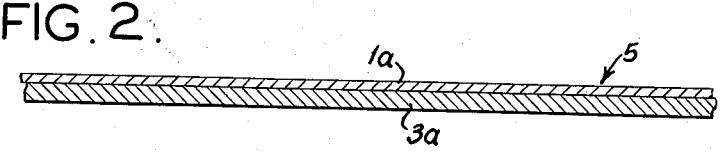
Fig. 2 is a fragmentary section showing the two-layer intermediate or "B" plate after bonding and rolling illustrating the reduction in thickness effected by rolling.
Figure 3:
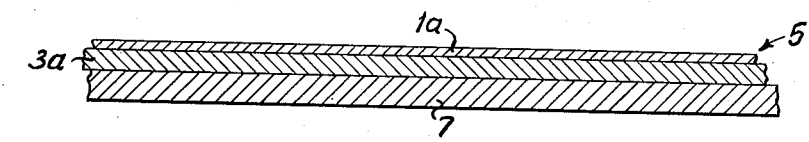
Fig. 3 is a fragmentary section showing the "B" plate of Fig. 2 superposed on another base metal layer prior to rolling to effect solid-phase bonding thereof; and, Fig. 4 is a view illustrating the rolling and reduction of the Fig. 3 material to form the final product.
Figure 4:
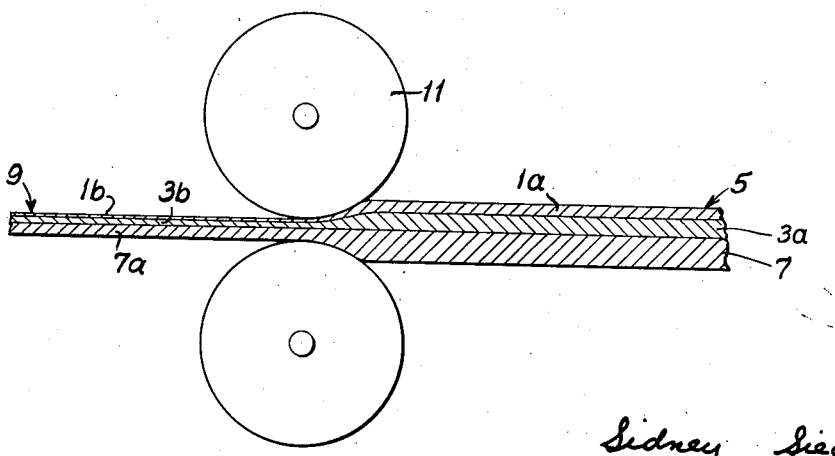

Referring to the drawing, Fig. 1 illustrates a layer 1 of a precious or rare metal (gold or platinum, for example) superposed on a layer 3 of a base metal (stainless steel, Phosphor bronze, iron, nickel, nickel silver, or brass, for example). These layers are either solid-phase bonded as disclosed in any one of the above-mentioned copending applications, or bonded by known conventional processes as specified above, to form a "B" plate. The as-bonded thickness of the "B" plate is substantially greater than the "critical gauge," and it is rolled down on a precision rolling mill to a gauge equal to or greater than the critical gauge, resulting in the two-layer strip or "B" plate 5 shown in Fig. 2, wherein the layers are designated 1a and 3a, having been considerably reduced over their original thickness. Then the two-layer intermediate strip or "B" plate 5 is superposed on another base metal strip 7, with base metal layer 3a against strip 7 (Fig. 3). This composite is rolled to effect solid-phase bonding of the two base metal layers, as illustrated in Fig. 4, rolling with such a reduction in thickness as to effect solid-phase bonding of the base metal layers at the temperature of rolling which is below that at which any liquid phase material might form at the interface of the metals. This produces a long continuous three-layer strip 9 shown emerging at the left of the rolls 11 in Fig. 4, wherein previous layers 1a and 3a are designated 1b and 3b, the thickness of these layers having again been considerably reduced, and wherein previous layer 7 is designated 7a, the thickness of this layer also having been considerably reduced, and the combined thickness, of course, also having been considerably reduced over that shown in Fig. 3.

Where the "B" plate is made by solid-phase bonding, layer 1 is a strip having a thickness at least as great as the "critical gauge", always being thin enough to be readily handled. Layer 3 is a strip having a thickness such that it can be readily handled in the rolling operation (for example, thin enough for the strip to be readily coiled) and sufficiently thick that the thickness of intermediate 5 is at least as great as the critical gauge, but such that strip 3 is less in quantity than the quantity of base metal required to give the desired quality or assay for the final plate. If heat-treating is necessary to perfect the bond between the layers, this is done after rolling to solid-phase bond the layers, but before rolling down to or above the "critical gauge" to form the intermediate 5. The criterion as to the thickness of strip 7 is that it be of such thickness as to bring the quality or assay of the final plate down to the desired quality, but thin enough for the strip to be readily handled.

In practice, I have carried out the rolling of the strips comprising the "B" plate with a Sendzimir rolling mill, which is one of the most precise economically available mills, and which has rolling error characteristics approximately as follows:

In rolling material under .004 inch thick, the tolerance is approximately plus or minus .00020 inch, or plus or minus 5%. In rolling material from .004 to .009 inch thick, the tolerance is plus or minus .00020 inch, or plus or minus 5% to 2.2%. In rolling material from .009 to .025 inch thick, the tolerance is plus or minus .00025 inch, or plus or minus 2.2% to 1%. In rolling material thicker than .025 the tolerance is substantially constant at about plus or minus 1%.

It will be seen that the "critical gauge" of the above-mentioned mill is approximately .025 inch.

I have also found it preferable to limit the overall combined thickness of material before rolling for the solid-phase bonding operation to not more than .300 inch for convenience in handling.

As a specific example of the invention, using the above-mentioned Sendzimir mill, assume that it is desired to produce twelve karat $\frac{1}{20}$ quality gold on nickel strip. This means that the final strip consists of a layer of twelve karat gold on nickel with the weight of the gold one-twentieth the total weight. Such plate is referred to in the art as a low-quality plate.

I start by rolling solid twelve karat gold to the "critical gauge," in this case .025 inch. This keeps the thickness of the resultant gold strip accurate within plus or minus 1%, that is, the resultant strip will not vary in thickness more than plus or minus 1% from .025 inch. Then, (using solid-phase bonding to make the "B" plate) this gold strip is bonded in a 2-high or 4-high mill of proper size by rolling in a single pass with a strip of nickel .075 inch thick, with a 60% reduction. The resultant two-layer strip is .040 inch thick overall as bonded. It is heated to improve the bond and then the resultant plate is rolled in the Sendzimir mill to the "critical gauge," that is, to .025 inch plus or minus 1%. At this point the gold layer is .00625 inch thick and the nickel layer is .01875 thick. Then the .025 inch two-layer strip is rolled in a 2-high or 4-high mill of proper size with a strip of nickel of such thickness (and with a single pass of approximately 60% reduction) as to bring the final quality or assay to the specified $\frac{1}{20}$ value. If the bonding operation were done at an elevated temperature, the reduction required would be less (e. g. at 1000° F., 20% reduction). The computation of the thickness of the second nickel layer is within the skill of the art, and it is not regarded as necessary to set forth the computation in detail.

As a further example of the invention, a layer of fourteen karat yellow gold 0.031 inch thick is plated by a conventional hot bonding process to a layer of nickel 0.375 inch thick to form a "B" plate, which is then rolled to 0.060 inch thick. This is then plated by solid-phase bonding on a layer of nickel 0.0735 inch thick. This produces a gold plate having the quality of $\frac{1}{20}$ fourteen karat.

As a further example of the invention, a layer of ten karat yellow gold 0.031 inch thick is plated by a conventional liquid phase hot bonding process to a layer of nickel 0.375 inch thick to form a "B" plate which is subsequently rolled to 0.060 inch thick. This is then plated by solid-phase bonding on a layer of nickel 0.0575 inch thick. This produces a gold plate having the quality of $\frac{1}{20}$ ten karat.

As a further example, a layer of platinum 0.015 inch thick is plated by a conventional liquid phase hot bonding process to a layer of nickel 0.375 inch thick to form a "B" plate, which is subsequently then rolled to 0.030 inch thick. This is then plated by solid-phase bonding on a layer of nickel 0.0277 inch thick to produce a platinum plate 0.010 inch thick, consisting of 0.0002 inch of platinum on 0.0098 inch of nickel.

As to the actual practice of the invention, assuming for example that a twelve karat gold on nickel plate of $\frac{1}{20}$ quality of a specified total thickness is to be manufactured, the requisite thicknesses of gold and nickel necessary in the final plate to provide this quality would first be computed. Then, a gold-nickel intermediate would be rolled as above described and then bonded to another nickel layer, the initial thickness of the layers being originally selected in accordance with the principles of the invention to produce the necessary final thicknesses required for 1/20 quality.

The invention makes it possible economically to manufacture low quality plate by continuous rolling processes, by making it possible to use strips thin enough to be handled in a small mill with continuous processing, while thick enough to avoid too high an error in quality or assay.

Another advantage of the invention is that it allows for an intermediate measure for control on the final assay. This is possible due to the fact that the two-layer intermediate 5 can be assayed, exactly to determine what thickness of strip 7 should be combined therewith.

The term "metal" is used herein in its broad sense including alloys.

In view of the above, it will be seen that the several objects of the invention are achieved and other advantageous results attained.

As many changes could be made in the above methods without departing from the scope of the invention, it is intended that all matter contained in the above description or shown in the accompanying drawing shall be interpreted as illustrative and not in a limiting sense.

I claim:

1. The method of manufacturing a long continuous length of low-quality precious or rare metal plate, with close control on the quality or assay selected for the final product within a small tolerance, utilizing means for effecting reduction of the metals having an inherent critical gauge above which the error in reduction is a minimum, comprising reducing a layer of the precious or rare metal to a gauge no less than the critical gauge so as to provide a precious or rare metal layer with minimum error in gauge, the precious or rare metal in said layer constituting the whole of the precious or rare metal to go into the final product, bonding the reduced layer of the precious or rare metal to a layer of a base metal of a gauge no less than the critical gauge and constituting only a part of the base metal necessary for the final quality or assay to form a two-layer intermediate product, reducing the said two-layer intermediate product to a gauge such that the intermediate product may be readily coiled but not less than the critical gauge so that error in gauge is kept to a minimum, and then solid phase bonding the base metal of the reduced two-layer intermediate product throughout its length to a second layer of the base metal of such gauge as to supply the additional quantity of base metal needed to provide the selected final quality or assay and low enough that the second layer may be readily coiled by squeezing the intermediate product and said second layer together with such a reduction and at such a temperature as to bond them together in the solid phase.

2. The method of manufacturing a long continuous strip of low-quality precious or rare metal plate, with close control on the quality or assay selected for the final product within a small tolerance, utilizing a rolling mill having an inherent critical gauge above which the error in reduction is a minimum, comprising rolling a layer of the precious or rare metal to a thickness no less than the critical gauge so as to provide a precious or rare metal layer with minimum error in thickness, the precious or rare metal in said layer constituting the whole of the precious or rare metal to go into the final product, bonding the reduced layer of the precious or rare metal to a layer of a base metal no thinner than the critical gauge and constituting only a part of the base metal necessary for the final quality or assay to form a two-layer intermediate product, rolling the said two-layer intermediate product to a thickness thin enough to be readily coiled but not less than the critical gauge so that error in thickness is kept to a minimum, and then solid phase bonding the base metal of the reduced two-layer intermediate product throughout its length to a second layer of the base metal of such thickness as to supply the additional quantity of base metal needed to provide the selected final quality or assay and thin enough to be readily coiled by rolling the intermediate product and said second layer together with such a reduction and at such a temperature as to bond them together in the solid phase.

References Cited in the file of this patent

UNITED STATES PATENTS

| Number | Name | Date |
| --- | --- | --- |
| 1,076,197 | Demel | Oct. 21, 1913 |
| 1,904,241 | Kammerer | Apr. 18, 1933 |
| 2,024,150 | Davignon | Dec. 17, 1935 |
| 2,121,559 | Demel | June 21, 1938 |
| 2,354,409 | Strasser | July 25, 1944 |
| 2,364,674 | Swift | Dec. 12, 1944 |